United States Patent
Jennings

[15] 3,659,963
[45] May 2, 1972

[54] PRESSURE OVERRIDE FOR SERVO CONTROLLED PUMPS

[72] Inventor: Lyston C. Jennings, Watertown, N.Y.
[73] Assignee: General Signal Corporation
[22] Filed: Mar. 19, 1970
[21] Appl. No.: 20,892

[52] U.S. Cl. .................................. 417/213, 417/213, 91/506
[51] Int. Cl. ............................................................. F04b 49/00
[58] Field of Search ............. 60/52 USP; 417/212, 213, 218, 417/222; 91/505, 506; 137/625.62

[56] References Cited

UNITED STATES PATENTS 3,416,452  12/1968  Misulis .................................. 417/222
3,132,487  5/1964  Tyler ..................................... 60/52 US
3,390,615  7/1968  Hayner et al. ..................... 137/625.62
3,138,067  6/1964  Cadiou .............................. 137/625.62

*Primary Examiner*—William L. Freeh
*Attorney*—Dodge & Ostmann

[57] ABSTRACT

A pressure override for servo controlled pumping apparatus which reduces pump delivery rate as needed to limit discharge pressure by overpowering the servomechanism, in contrast to disabling this device by interrupting its input signal circuits or its supply of motive power.

7 Claims, 1 Drawing Figure

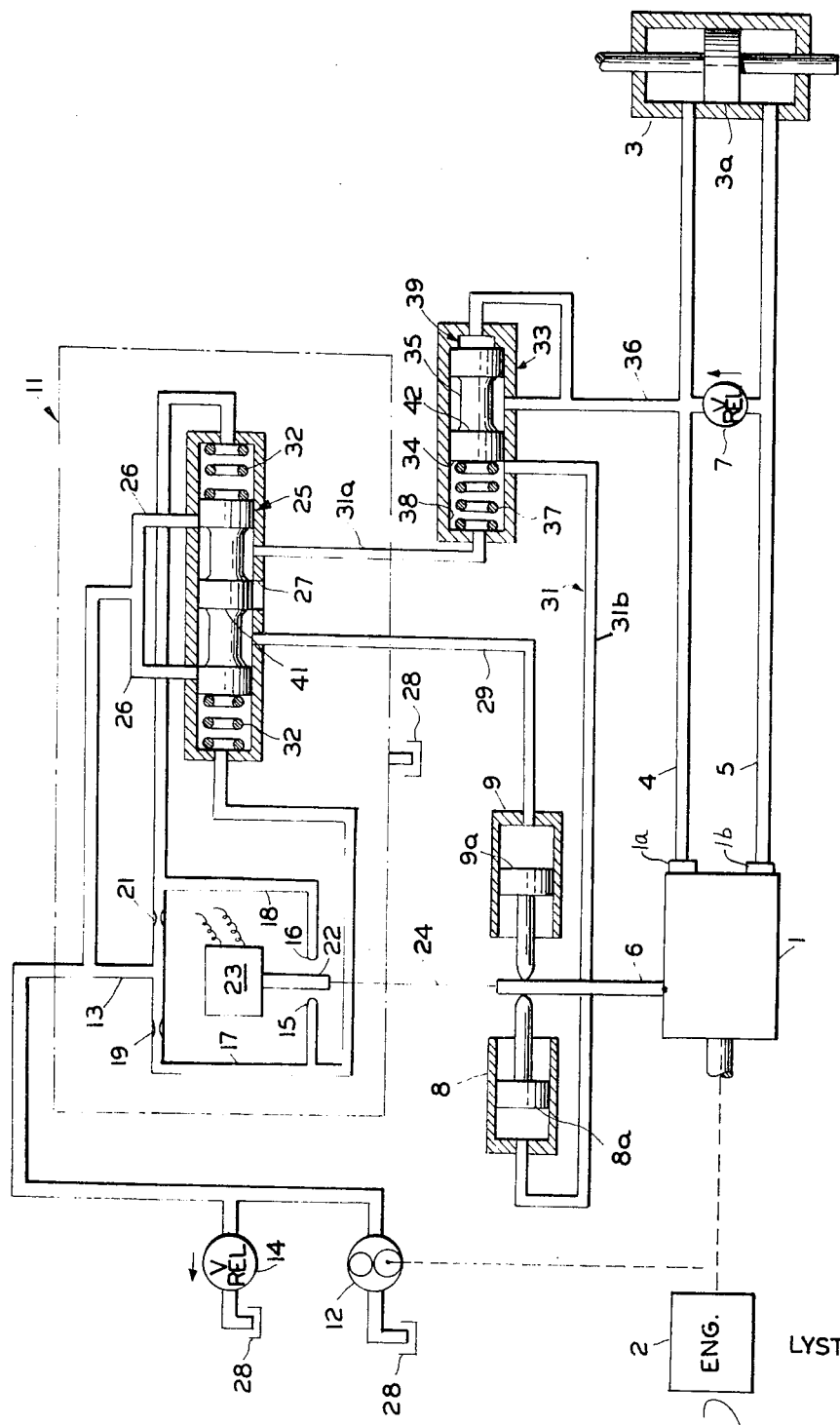

PRESSURE OVERRIDE FOR SERVO CONTROLLED PUMPS

BACKGROUND AND SUMMARY OF THE INVENTION

A servo pump is a special type of hydraulic pump incorporating a servomechanism, commonly of the electrohydraulic type, which controls its rate and direction of delivery in accordance with the size and sense, respectively, of an input signal. Frequently these pumps are used in closed loop control systems wherein they deliver hydraulic power to a reversible hydraulic motor which is intended to effect accurate and rapid changes in the position of some object. In these systems, the input signal to the servomechanism is an error signal representing the difference between the desired and the actual positions of the controlled object. The system is so designed that the magnitude of the error signal developed during normal operation does not cause the pump to deliver fluid at a rate which would produce excessive pressures in the hydraulic circuit. However, since the error signal is independent of system pressure, prudence dictates that the hydraulic components be protected against excessive pressures, i.e., pressures which exceed their design limits.

One obvious way to satisfy this safety requirement is to provide the discharge conduit of the pump with a high pressure relief valve which will open and divert fluid to the reservoir when the discharge pressure of the pump exceeds the desired maximum value. However, this approach is not acceptable because, under some conditions, the relief valve is required to by-pass the maximum output of the pump, and this leads to overheating of the system. Another approach consists in providing a pressure responsive device which interrupts or cancels the error signal upon the occurrence of an excessive pressure condition, so that the servo control effects a reduction in pump delivery and in that way eliminates the offending condition. Although this scheme avoids the heating problems associated with the relief valve, it introduces stability problems under override conditions which are even more difficult to solve. A third, and similar, approach consists in disabling the servomechanism by means of a pressure responsive valve which interrupts its supply of motive fluid, and in providing some means for producing a bias which will move the delivery control element of the pump to a reduced delivery position after the servomechanism has been disabled. While overrides of this general kind have been used successfully in controls for certain hydrostatic transmissions wherein the servomechanism is operated manually (see, for example, U.S. Pat. No. 3,117,420), these devices require large control packages, which would preclude their use on aircraft or in other applications where size and weight are critical, and they contain mechanical linkages which introduce inertia and backlash that could impose performance limitations and give rise to stability problems if the override were incorporated in a high performance system utilizing fast acting servomechanisms, such as the electrohydraulic servo valve.

The object of this invention is to provide a practical, compact pressure override control for a servo pump which is free of the problems associated with the three approaches just mentioned. According to the invention, the desired protection against overpressure conditions is provided by reducing pump delivery rate, so the overheating problems which characterize the relief valve approach are inherently avoided. And, in contrast to the other two proposals, reductions in the delivery rate of the pump needed to limit discharge pressure are effected by overpowering, rather than disabling, the servomechanism. This approach inherently can be implemented using simple, compact apparatus, and, since the servomechanism always remains active and unaffected by the action of the override mechanism, the new scheme imposes no performance limitations on the system during normal operation and creates no stability problems during override conditions.

A common type of servo controlled pumping apparatus includes a variable displacement pump of the overcenter type having a displacement control element which is movable in opposite directions from a neutral or zero displacement position to control both the displacement of and the direction of flow through the pump. This element is positioned by a pair of opposed fluid pressure motors which are pressurized and vented in reverse senses through a four-way, follow-up servo valve. In situations where overpressure protection is required in only one direction of flow, the invention can be applied to this apparatus by merely including a selector valve which connects the displacement-reducing motor with either the servo valve or a source of fluid at overpowering pressure depending upon whether the discharge pressure is below or above, respectively, the permissible limit. On the other hand, if protection in both directions of flow is desired, a selector valve of this kind is included in the connection to each of the positioning motors; one valve responding to the pressure at one of the pump ports, and the other valve responding to the pressure at the other pump port. In either case, the pump itself may be used as the source of fluid for overpowering purposes if the servomechanism operates at a lower pressure level, which it usually would, and the positioning motors have equal effective areas. In the unidirectional protection scheme, motive fluid for overpowering purposes could also be taken directly from the supply for the servomechanism if the displacement-reducing motor is made the larger of the two motors.

BRIEF DESCRIPTION OF THE DRAWING

The preferred embodiment of the invention is described herein in detail with reference to the accompanying drawing whose single FIGURE shows, in schematic form, a unidirectional version of the new override control embodied in a typical servo pumping apparatus.

DETAILED DESCRIPTION OF PREFERRED EMBODIMENT

As shown in the drawing, the improved servo controlled pumping apparatus includes a variable displacement, overcenter pump 1 of the rotary cylinder barrel, longitudinally reciprocating piston type which is driven by an engine 2 and is connected in a closed circuit with a double-acting ram 3 via conduits 4 and 5. The ram actuates some object (not shown) whose position is to be controlled. The displacement per revolution and the direction of flow through pump 1 are controlled by a lever 6 which is attached to its cam plate and which can pivot in opposite directions from the illustrated zero displacement position. For purposes of this description, it is assumed that pump 1 discharges through port 1a when lever 6 is moved in the counterclockwise direction from the illustrated position, and that it discharges through port 1b when the lever moves in the opposite direction from the neutral position. It also is assumed that the actuating pressure required to move the ram piston 3a down can approach the design limit of pump 1, whereas the actuating pressure required to move the piston in the opposite direction is relatively low. Therefore, the override control provided by the invention need be effective only when pump 1 is discharging through port 1a, and a simple relief valve 7 can be used to limit system pressure during reverse operation.

The control lever 6 of pump 1 is positioned by a pair of opposed, equal area piston motors 8 and 9 which are controlled by a conventional two-stage electrohydraulic servo valve 11. An auxiliary, fixed displacement pump 12, driven by engine 2, delivers motive fluid to the supply passage 13 of valve 11 at a low pressure determined by the relief valve 14. The first stage of servo valve 11 comprises a pair of nozzles 15 and 16 which are connected with supply passage 13 through passages 17 and 18 containing inlet orifices 19 and 21, respectively, and which are controlled by a flapper 22. The position of the flapper relative to the nozzles is determined by the joint action of an electric torque motor 23 and a deflectable feedback wire 24, and, as the flapper 22 moves from its center, neutral position, it changes in reverse senses the pilot pressures in the portions of passages 17 and 18 between the nozzles and the inlet orifices. The second stage of servo valve 11 is defined by a four-way spool valve 25 on which the pilot pressures in passages 17 and 18 act in opposition to each other. Valve 25 is provided with a pair of inlet passages 26 which lead to supply passage 13, an exhaust passage 27 which is connected with a reservoir 28 through the casing of valve 11, and a pair of outlet passages 29 and 31 which are connected with positioning motors 8 and 9, respectively. Valve 25 also includes a pair of centering springs 32 which bias it to the illustrated neutral position wherein its lands preclude free flow between the passages 26, 27, 29 and 31. Although the fit between spool valve 25 and the cooperating bore usually is more precise than the fits between motor pistons 8a and 9a and their cylinders, it must be realized that some internal leakage occurs in these devices as well as in the selector valve described later.

When flapper 22 of the first stage of valve 11 moves to the left from its center position, the pressure in passage 17 rises relatively to the pressure in passage 18, and second stage valve 25 shifts to the right from its neutral position to open a supply path from the right inlet passage 26 to motor 8 and an exhaust path from motor 9 to exhaust passage 27. As a result, motor 8 shifts lever 6 in the clockwise direction and causes pump 1 to discharge through port 1b. On the other hand, when torque motor 23 receives an input signal of the opposite polarity, flapper 22 moves toward nozzle 16, the pressure in passage 18 rises relatively to the pressure in passage 17, and valve spool 25 shifts to the left from its neutral position. Now, fluid is delivered to motor 9 from the left inlet passage 26, and the oil displaced from motor 8 can flow to reservoir 28 through port 27, so lever 6 is moved in the counterclockwise direction from neutral position. As a result, pump 1 discharges through port 1a.

It is important to note that, when pump 1 is discharging through port 1a, positioning motor 8 acts on lever 6 in the displacement-reducing direction. In view of this and the aforementioned assumption that special overpressure protection is required only during operation in this direction, the selector valve 33 provided by the invention is interposed in the passage 31 leading from valve 26 to motor 8. The valve 33 divides passage 31 into portions 31a and 31b and includes a spool 34 which is shiftable between the illustrated normal position, in which it interconnects these portions, and an override position in which it interrupts communication between passage portions 31a and 31b and connects the latter with main conduit 4 via spool groove 35 and passage 36. The spool 34 of the selector valve is urged toward the normal position by a spring 37 and the low pressure fluid in chamber 38, and is shifted to the override position by a pressure motor 39 including the right end of the spool and a working space which is connected with passage 36. Spring 37 and actuating motor 39 constitute a motor means which holds valve spool 34 in normal position as long as the pressure in conduit 4 (i.e., the discharge pressure of pump 1 when the latter is delivering oil through port 1a) is below the permissible maximum, and shifts the spool to override position when this pressure limit is exceeded.

In order to effect downward movement of ram piston 3a, torque motor 23 is supplied with a signal of a polarity which causes it to shift flapper 22 toward nozzle 16. As mentioned above, this action causes spool valve 25 to open a supply path to motor 9 and an exhaust path from motor 8, with the result that lever 6 is moved away from neutral in the counterclockwise direction and pump 1 commences to discharge fluid into conduit 4. The flow paths to and from motors 9 and 8, respectively, are throttled at valve 25, and the degree of throttling decreases with the distance the valve shifts from its neutral position. Since this distance is a function of the deflection of flapper 22, it follows that the speed at which motor 9 moves lever 6 varies directly with the displacement of flapper 22 from its centered position. As lever 6 moves away from neutral position, feedback wire 24 exerts an increasing torque on flapper 22 which urges it toward the centered position against the opposition of torque motor 23. When the lever reaches the displacement position corresponding to the magnitude of the input signal, this restoring torque will have returned flapper 22 to the center position. Therefore, at this time, centering springs 32 return valve 25 to neutral position. Because of the presence of feedback connection 24, the servo control will maintain lever 6 in its present position, in spite of leakage at motor 9 or valve 25, until the magnitude of the input signal is changed.

When the input signal supplied to torque motor 23 is subsequently reduced to zero, the torque which is being applied to flapper 22 by flexed wire 24 will deflect the flapper toward nozzle 15. This action unbalances the pilot pressures in the sense that effects rightward movement of spool valve 25 from neutral position, thereby causing this valve to pressurize motor 8 and vent motor 9. As a result, motor 8 returns lever 6 to neutral position and reduces the delivery rate of pump 1 to zero. When the lever reaches the neutral position, flapper 22 will be centered, valve spool 25 will have returned to its neutral position, and the piston 3a of ram 3 will come to rest.

If, at any time during downward movement of piston 3a, the pressure in conduit 4 should exceed the permissible maximum, motor 39 will move spool 34 of selector valve 33 to override position and cause it to transmit to motor 8 fluid at the high pressure prevailing in conduit 4. Since this pressure is much higher than the operating pressure of the servomechanism (i.e., the pressure established by relief valve 14), motor 8 will overpower motor 9 and move lever 6 in the displacement-reducing direction. At the commencement of this movement, oil can escape from motor 9 to reservoir 28 through passages 26 and 13 and relief valve 14, if valve 25 is out of neutral position, or, if valve 25 is in neutral position, through internal leakage in the valve or the motor. However, once lever 6 begins to move, the restoring torque exerted by feedback wire 24 will decrease, so torque motor 23 will deflect flapper 22 toward nozzle 16 and insure that valve 25 will assume a position to the left of neutral position. Therefore, most of the oil expelled from motor 9 during override movement of lever 6 will return to tank 28 via passages 29, 26 and 13 and relief valve 14. When the displacement of pump 1 has been reduced sufficiently to restore system pressure to the desired level, spring 37 will move spool 34 to a lap position in which land 42 interrupts the flow of oil from conduit 4 to motor 8, thereby preventing a further decrease in displacement.

If the input signal to torque motor 23 persists, valve 25 remains to the left of neutral position, and motor 9 is continuously subjected to the pressure established by relief valve 14. Therefore, if oil leaks from the working space of motor 8 (e.g. past its piston 8a or past valve land 42), motor 9 will tend to move lever 6 in the displacement-increasing direction. However, as soon as movement occurs, the resulting change in the output of pump 1 will raise system pressure above the desired limit, and valve 33 will again pressurize motor 8 and cause it to return lever 6 to the reduced displacement position required by the pending overpressure condition. Thus, until operating conditions change, lever 6 will be maintained in the reduced displacement position.

When the overload condition abates, the pressure in conduit 4 will drop below the setting of selector valve 33, and spring 37 will return spool 34 to the normal position. Since the input signal has not been reduced or cancelled, motor 9 will still be pressurized; therefore, when valve 33 reopens the exhaust path from motor 8 to reservoir 28 through passage portions 31b and 31a, motor 9 becomes effective immediately to move lever 6 to the increased displacement position called for by the input signal.

On the other hand, if the overload condition has not abated but the input signal is reduced to a level below that corresponding to the current overload position of lever 6, feedback wire 24 will shift flapper 22 to the left of center and unbalance the pilot pressures in the sense that causes valve spool 25 to shift to the right to and through the neutral position. This movement of the valve 25 opens the exhaust path from passage 29 to exhaust passage 27, and also opens a supply path from the right inlet passage 26 to passage portion 31a. Since the shifting forces acting on spool 34 had been in equilibrium with the spool in the lap position and chamber 38 vented, it is evident that the application of servo pressure to this chamber will cause spool 34 to move to the illustrated normal position and re-establish free communication between passage portions 31a and 31b. As a result, motor 8 is pressurized and moves lever 6 quickly to the smaller displacement position called for by the reduced input signal.

It is appropriate to remark here that the preferred selector valve 33 uses a spool 34 which responds to the differential between the pressures in conduit 4 and passage portion 31a because this feature insures fast response of the positioning controls in the situation just described, and it can be included without complicating the design of the valve or increasing its cost. If the connections of passages 31a, 31b and 36 to the valve were relocated and chamber 38 were provided with a continuously open vent connection, spool 34 would respond exclusively to changes in the pressure in conduit 4, and the valve still would perform its essential functions. However, in the case where the input signal is cancelled or its polarity is reversed while an overload condition exists, motor 8 would not respond as quickly as in the preferred embodiment because initially it would be supplied with oil solely through the internal leakage paths in valve 33 (it being remembered that spool 34 is in lap position at the commencement of this operation and that it will shift to normal position only after the pressure in conduit 4 drops below the permissible limit). Although only a small quantity of oil is required to enable motor 8 to change the displacement of pump 1 sufficiently to reduce system pressure below the critical level and permit valve 33 to establish free communication between passage portions 31a and 31b, the fact remains that the leakage paths are restricted, so initial movement of motor 8 necessarily will be retarded to some degree.

Upward movement of ram piston 3a is effected by changing the polarity of the input signal and thereby causing torque motor 23 to deflect flapper 22 toward nozzle 15. Now, spool 25 shifts to the right from neutral position to pressurize and vent motors 8 and 9, respectively, and motor 8 moves lever 6 in the clockwise direction from neutral position to increase the displacement of pump 1 and cause it to discharge through port 1b. As in the other mode of operation, lever 6 will be moved at a speed proportional to the deflection of flapper 22 and will come to rest when it reaches the position corresponding to the magnitude of the input signal. However, in this case, conduit 4 is the suction conduit of pump 1 and remains at a low pressure; therefore, selector valve 33 remains in its normal position and has no effect whatever upon the operation of the pumping apparatus.

Although it has been assumed that the illustrated apparatus requires special overload protection in only one direction of operation, there are situations in which excessive pressures can be developed in both directions of operation. In these cases, each of the outlet passages 29 and 31 would be provided with a selector valve 33; the passage 36 associated with the valve in passage 29 being connected with main system conduit 5.

I claim:

1. A servo controlled pumping apparatus including a variable delivery pump (1) having a delivery control element (6) which is positioned by a servo-mechanism (11) in accordance with variations in an input signal, and characterized by override control means (33, 8) which responds to the discharge pressure of the pump and acts on the delivery control element (6) in opposition to and concurrently with the servomechanism, the override means serving to overpower the positioning effort of the servomechanism and move the delivery control element in the delivery-reducing direction as needed to limit the pressure to a predetermined level.

2. The apparatus defined in claim 1 in which
   a. the delivery control element (6) is movable to opposite sides of a zero delivery position to cause the pump to discharge through one or the other of a pair of ports (1a, 1b) as well as to vary delivery rate; and
   b. the override control means (33, 8) responds to the pressure at only one (1a) of said ports and is ineffective at times when the pump is discharging through the other port (1b).

3. The apparatus defined in claim 1 in which
   a. the delivery control element (6) is positioned by a pair of opposed fluid pressure motors (8, 9);
   b. the servomechanism (11) includes a follow-up servo valve (15, 16, 22, 25) through which said motors are pressurized and vented in reverse senses; and
   c. the override control means comprises
      1. a selector valve (33) interposed in the connection (31) between the servo valve and that motor (8) which moves the control element (6) in the delivery-reducing direction and shiftable between normal and override positions in which, respectively, it connects the motor (8) with the servo valve or with a source (1) of fluid at a pressure sufficient to enable that motor (8) to overpower the other motor (9); and
      2. motor means (37, 39) responsive to the discharge pressure of the pump (1) for maintaining the selector valve in normal position when the pressure is below said predetermined level and for shifting that valve to the override position when the pressure rises above that level.

4. The apparatus defined in claim 3 in which
   a. the fluid pressure motors (8, 9) have equal effective areas;
   b. the servomechanism (11) operates at a pressure below said predetermined level; and
   c. said source of fluid is the pump (1) itself.

5. The apparatus defined in claim 3 in which
   a. the delivery control element (6) is movable to opposite sides of a zero delivery position to cause the pump to discharge through one or the other of a pair of ports (1a, 1b);
   b. there is only one selector valve (33) and it is interposed in the connection (31) between the servo valve and that motor (8) which reduces delivery rate when the pump is discharging through the first port (1a); and
   c. the motor means (37, 39) responds to the pressure at said first port (1a).

6. The apparatus defined in claim 5 in which
   a. the fluid pressure motors (8, 9) have equal effective areas;
   b. the servomechanism (11) operates at a pressure below said predetermined level; and
   c. said source of fluid is the pump (1) itself and the fluid is taken from said first port (1a).

7. The apparatus defined in claim 3 in which
   a. the selector valve (33) has a lap position intermediate the normal and override positions in which it disconnects the delivery-reducing motor (8) from both the servo valve and the source; and
   b. the motor means comprises
      1. a spring (37) and means responsive to the pressure in that portion (31a) of said connection (31) between the selector and servo valves for urging the selector valve toward normal position, and
      2. a fluid pressure motor (39) which communicates with the discharge port (1a) of the pump (1) and is arranged to shift the selector valve to override position.

* * * * *